US012564805B2

(12) United States Patent
Schulte-Wülwer

(10) Patent No.: US 12,564,805 B2
(45) Date of Patent: Mar. 3, 2026

(54) FILTER INSERT FOR A FUEL FILTER WITH THREE-STAGE FILTRATION

(71) Applicant: Hengst SE, Münster (DE)

(72) Inventor: Tobias Schulte-Wülwer, Münster (DE)

(73) Assignee: Hengst SE (DE)

( * ) Notice: Subject to any disclaimer, the term of this patent is extended or adjusted under 35 U.S.C. 154(b) by 699 days.

(21) Appl. No.: 17/352,629

(22) Filed: Jun. 21, 2021

(65) Prior Publication Data

US 2021/0308608 A1      Oct. 7, 2021

Related U.S. Application Data

(63) Continuation of application No. PCT/EP2019/084527, filed on Dec. 10, 2019.

(30) Foreign Application Priority Data

Dec. 21, 2018    (DE) .......................... 102018133569.5

(51) Int. Cl.
B01D 36/00        (2006.01)
B01D 17/04        (2006.01)
             (Continued)

(52) U.S. Cl.
CPC ......... B01D 36/003 (2013.01); B01D 17/045 (2013.01); B01D 29/15 (2013.01); B01D 29/58 (2013.01); B01D 35/005 (2013.01); *B01D 2201/0415* (2013.01); *B01D 2201/291* (2013.01); *B01D 2201/347* (2013.01); *F02M 37/34* (2019.01)

(58) Field of Classification Search
CPC .... B01D 36/003; B01D 17/045; B01D 29/15;

B01D 29/58; B01D 35/005; B01D 2201/0415; B01D 2201/291; B01D 2201/347; B01D 2201/4084; F02M 37/34; F02M 37/22; F02M 37/24
USPC .... 210/315, 256, 314, 342, 338, 416.4, 446, 210/437, 450, 493.2, DIG. 5
See application file for complete search history.

(56) References Cited

U.S. PATENT DOCUMENTS

| | | | | |
|---|---|---|---|---|
| 2016/0151727 A1* | 6/2016 | Moreno Linares | .. | B01D 35/005 |
| | | | | 210/497.01 |
| 2017/0218895 A1* | 8/2017 | Girondi | .................. | B01D 29/15 |
| 2017/0312664 A1* | 11/2017 | Girondi | ................ | B01D 35/005 |

FOREIGN PATENT DOCUMENTS

| | | |
|---|---|---|
| DE | 102011120653 A1 | 6/2013 |
| DE | 102013016976 A1 | 4/2015 |
| | (Continued) | |

*Primary Examiner* — Madeline Gonzalez

(57)          ABSTRACT

A filter insert for use in a three-stage fuel filter. The components inside the filter medium include a support dome, a coalescer, a separator that is affixed to a carrier, and an end disc. The support dome, carrier, and end disc are constructed so that, during the process of assembling the various components of the filter insert, these components are held in the proper position to complete the assembly of the filter insert, without the use of latching mechanisms. The carrier either rests directly on a contour of the support dome and/or forms a seal with an adjacent component, be it the support dome or another component that is in contact with the support dome, and in that way provides sufficient holding power to hold at least the support dome and the carrier along with its separator close to the end disc.

14 Claims, 5 Drawing Sheets

(51) Int. Cl.
   *B01D 29/15*          (2006.01)
   *B01D 29/58*          (2006.01)
   *B01D 35/00*          (2006.01)
   *F02M 37/34*          (2019.01)

(56)                    References Cited

FOREIGN PATENT DOCUMENTS

| DE | 102014010997 A1 | 2/2016 |
| DE | 102015014600 A1 | 5/2016 |
| DE | 102015014282 A1 | 5/2017 |
| WO | 2016087916 A1 | 6/2016 |

* cited by examiner

FILTER INSERT FOR A FUEL FILTER WITH THREE-STAGE FILTRATION

BACKGROUND INFORMATION

Field of the Invention

The invention relates to the field of fuel filters that are used in combustion engines.

Discussion of the Prior Art

US 2016/0151727 A1 discloses a conventional fuel filter assembly that allows three-stage filtration. In a first stage, fuel flows through a filter medium, which filters out any particles and water contained in the fuel. In this conventional filter insert, the filter medium is designed as a cylindrical pleated paper filter through which fuel flows radially through the filter medium into the filter. The second stage coalesces fine water droplets into larger drops. This takes place in a coalescer that is provided inside the filter medium. In the third stage, the coalesced water droplets are separated out by means of a separator that is constructed as a hydrophobic sleeve. Due to their higher density, the coalesced drops of water flow downwards through the fuel and are collected in a water collection chamber that is provided at the bottom of the fuel filter assembly and which can be emptied regularly. An outlet port for the filtered fuel is provided at the top in the filter insert.

In three-stage filtration, the quality of the fuel varies, depending on where the fuel is in the filter unit. On the outside of the filter medium, the fuel is unfiltered and contains water and particles mixed in with the fuel. Between the filter medium and the coalescer, the fuel contains finely dispersed water droplets. The fuel between the coalescer and the separator is substantially free of particles, but still contains water that has been agglomerated into larger drops. The fuel that flows through the separator is filtered fuel, from which both water and particles have been removed as much as possible.

The core task of the filter is to protect sensitive components, such as the injection system, valves, etc., that are downstream of the filter from foreign particles. The separator, which in this conventional filter is a sieve, is held in place in the filter insert by means of a form-fitting connection, i.e., latching hooks. When assembling the various components to a complete filter insert, the latching hooks must first be opened. The fact that these hooks must be manipulated opens up the risk that the hooks might not be properly latched or that may become damaged, with the result that leaks may occur between the various areas of the filter insert, resulting in unfiltered fuel reaching downstream components. There is also the possibility that a damaged latching hook may fail or break off later during operation of the filter, thus creating another risk of damaging the downstream components.

WO 2016/087916 discloses a filter insert of the generic type for a fuel filter. This filter cartridge does not have a coalescer, nor are there seals to prevent an unintended flow of unfiltered fuel into various spaces within the fuel filter. Instead, bypass channels which connect adjacent spaces to one another are provided in the various embodiments of this filter insert.

High demands are placed on the quality of the fuel for the injection systems of internal combustion engines in order to maintain strict environmental requirements. Injection systems contain components that can be damaged and/or can become less precise by the impact of water. It is therefore necessary to reliably seal off the different spaces within the fuel filter with respect to one another, in order to ensure that only fuel that has passed through the proper treatment stages flows into a downstream space.

What is needed, therefore, is a filter insert that is assemblable in a fuel filter, without having to manipulate latching devices. What is further needed is such a filter insert that provides reliable sealing within the filter insert to ensure a proper flow path of fuel and water.

BRIEF SUMMARY OF THE INVENTION

The object of the invention is a filter insert for a fuel filter that is easily assemblable in the fuel filter and that provides a reliable seal between the various filter areas within the fuel filter.

The filter insert according to the invention includes an upper end disc, a carrier for the separator, and the upper end of a support dome for the filter medium that are constructed to allow assembly of these components without the need for manipulable holding devices, such as latching hooks. Instead of such devices, the components in the filter insert are constructed such, that certain contours on one or more components provide a means of support for the carrier during assembly of the insert. There are several different constructions that provide the desired support and these will be discussed in detail below. In addition to providing a means of support for the carrier, the carrier and the upper end disc each form a seal against an adjacent component. In this way, the filter insert according to the invention has a mechanically robust construction that facilitates assembly of the various components and at the same time provides reliable seals between the various filter areas inside the fuel filter.

In one construction of the filter insert according to the invention the support dome has a shoulder and the carrier is supported on this shoulder. The carrier has a seal lip that provides a seal in the radial direction against the support dome, relative to a central axis of the filter medium, rather than in the axial direction. In the simplest case, the end disc and the support dome limit the axial mobility of the carrier. It is also possible that the end disc and support dome engage with each other in a way that holds the carrier in place in a different manner. For example, rather than seating the carrier on a shoulder, the seal lip on the carrier forms a radial seal that presses with a force against the support dome or an adjacent component that is sufficient to hold the carrier in place during the assembly process. In this way, the need for latching devices is eliminated.

The carrier should seal off a flow path that would allow fuel to flow toward the fuel outlet without passing through the separator. The radial seal lip on the carrier provides a tight seal that prevents this from happening. It should be noted, that this seal is considered to be a tight seal, even if, at a suitable place in the filter, for example in the filter housing or in the filter insert, a vent bore is provided through which gas that has collected on the unfiltered side during the filtering process can be discharged to the filtered side or can be discharged by means of an intermediate stage, since during operation typically only air is discharged through this vent and a bypass of fuel through this vent is not desired and occurs only in borderline cases.

The carrier may be mounted in a floating manner, that is to say, be somewhat movable in the axial direction. The radial seal on the carrier allows for some slight axial mobility of the carrier, i.e., play, while still maintaining a seal. This ability to allow for play also has the advantage that the assembly is able to accommodate manufacturing tolerances, both with regard to manufacturing tolerances and assembly tolerances. Manufacturing tolerances relate to the dimensions of the individual components of the filter insert, whereas assembly tolerances relate to variations that may occur in the assembly process, as will be explained in more detail below. The fact that the carrier is not rigidly fixed in an axial position within the filter medium while the filter insert is being assembled avoids the creation of gaps through which fuel could unintentionally flow from one area of the fuel filter into another during subsequent operation of the fuel filter.

The filter medium may be bonded at one of its two end faces—and, if appropriate, at both end faces—to an end disc. The support dome, on the other hand, is not directly connected to the relevant end disc, i.e., is not bonded to the end disc. For example, the filter medium may butt up against an end disc made of plastic and be welded to this end disc. This construction has proven to be extremely suitable in practice. The term 'welding' as it is used here encompasses forming a firm connection of two components, whereby at least one of the two components is in a doughy or fluid state. In this context, welding the filter medium to the end disc involves softening the end disc by any one of a suitable means, such as thermal, ultrasound, infrared radiation, or chemical. Even if the filter medium is a pleated paper filter element and is, thus, incapable of being softened, it is still 'weldable' to the end disc simply by pressing it into the softened end disc and then letting the softened material harden, for example, by cooling. If the filter medium itself is made of a plastic material, such as a foam, then it too may also be softened. In either case, heat is introduced into the end disc and/or the filter medium to soften material in order to bond the two components to each other.

In conventional filter inserts with latching devices, the introduction of heat could possibly damage the latches by weakening or deforming them. In the filter insert according to the invention, there are no such latch devices, thus, the use of heat to bond the filter medium to the end disc does not present a risk to the subsequent operation of the filter.

The welding process reduces the original overall dimension of two components that are welded together, because one component is pressed against the other in the axial direction. Because the filter insert according to the invention is sealed radially instead of axially, it is able to accommodate tolerances in the axial direction and reliably avoid undesired gaps between the individual areas of the filter insert.

The support dome may be sealed radially against a component that is adjacent to it, and the coalescer held against the support dome, thereby ensuring that the flowpath of the fuel to the fuel outlet is exclusively through the coalescer. As will be readily apparent to those skilled in the art, the support dome is not only sealed against the upper end disc and/or the carrier, but also against the lower end disc. The support dome may have a seal at its lower end or may be adhesively affixed or welded to the lower end disc. Here, too, it is also understood that a vent bore may optionally be provided through which substantially no fuel flows during operation of the filter, but rather, the gas that collects during filtration.

The support dome is radially centered inside the filter medium and serves to support the filter medium against pressures that arise during operation, i.e., to prevent it from collapsing. The seal lip that extends around the outer cir-cumference of the carrier, which is centered within the support dome, presses against the support dome to create a seal.

The end disc may have a support section that serves to enhance a tight seal of the seal lip of the carrier against the support dome. In this case, the support section is a collar-like ring that extends from the under surface of the end plate into the carrier, and specifically, in the region of the seal lip. The support section extends as far down on the inside of the carrier to the area where the seal lip is located on the outside of the carrier.

The carrier may also be supported by having the support section on the end disc extend down into the carrier to approximately where the carrier seal lip is located on the outside and, depending on the specific dimensions of the space, providing the individual components with radially greater diameters. In this way, the functional area of the seal is increased, particularly when the location of the carrier seal lip and the place where the end disc support section presses against the carrier are axially offset.

In contrast to the above-described embodiment in which the carrier rests sealingly on the inside of the support dome, the carrier may be sealed against the above-mentioned end disc. In this case, the end disc has a section that serves as a seal ring and that extends in the manner of a collar or a pipe socket into the interior of the hollow, cylindrical filter medium. The carrier presses up against this seal ring, either from the outside or from the inside.

In one embodiment, the seal ring of the end disc may extend into the interior of the carrier, so that the carrier presses up against the outside of this seal ring. Alternatively, the seal ring may have a larger diameter than that of the carrier, so that the carrier presses against the inside of the seal ring. In either case, the desired seal is achieved either by providing the seal ring with a seal lip that creates a seal against the carrier, or providing the carrier with a seal lip that presses against the seal ring of the end disc.

It is possible to ensure that a reliable seal is maintained, even at elevated temperatures and with a corresponding relaxation of the plastic components used in the filter. If, as described above, the carrier presses against the inside of the support dome to create the seal, the end disc may be provided with a support section which is constructed, similarly to the pipe socket described above that extends down around the support dome and presses against the outside of the support dome. This construction provides good support against the outward radial force acting on the support dome there, where the seal lip of the carrier presses against the inside of the support dome.

Two seal areas may be arranged in series in the filter insert in such a way that the radial forces of both seals act on and reinforce each other.

The force created by the seal between the carrier and the support dome can result in the carrier tilting. To prevent this, one or more projections may be provided outside on the carrier and/or inside on the support dome, which prevent the carrier from tilting within the support dome. These projections may be provided in the form of nubs. Constructing the projections as elongated ribs that extend in the axial direction, however, provides a structure that has high mechanical stability and that also offers the lowest possible resistance to the direction of flow of fluid flowing along the carrier, for example, water that has been held back by the separator. This type of construction improves the efficiency of the fuel filter, specifically, the function of the separator.

A plurality of projections may be distributed around the circumference of the carrier, so that the carrier is secured against tilting in any direction. If only a single projection is to be provided, it may extend helically around the circumference of the carrier and in this way support the orientation of the carrier in all radial directions and, at the same time, create a helical flow path for the fuel and/or the separated water.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
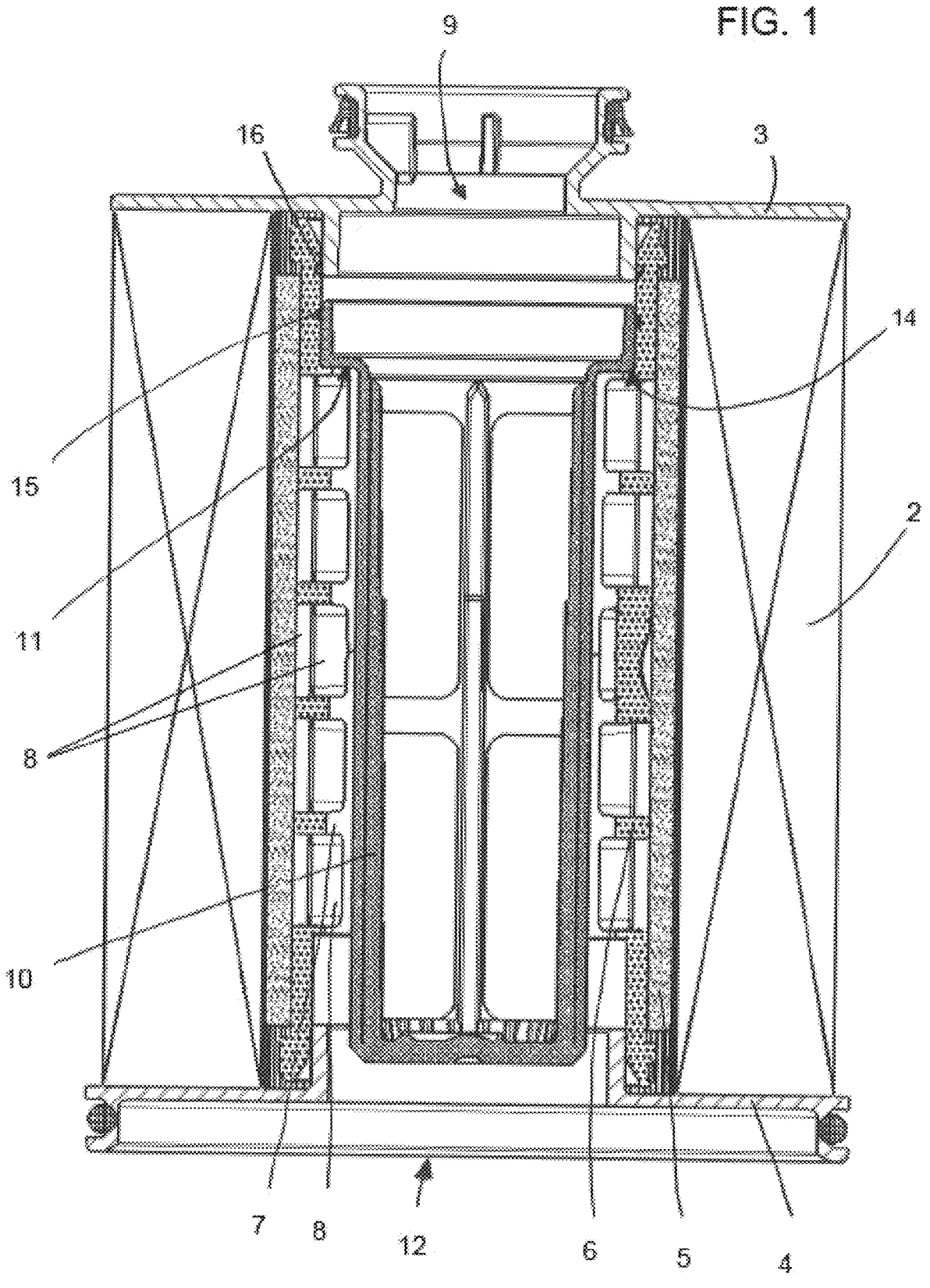
FIG. 1 is a cross-sectional view through a filter insert according to the invention, showing a first embodiment of the carrier supported on the support dome and two radial seals.

FIG. 1 is a cross-sectional illustration of a filter insert 1 according to the invention comprising a cylindrical filter medium 2 that is fixedly attached to an upper end disc 3 and a lower end disc 4. The illustrated orientation of the filter insert 1 and thus designations such as 'above' and 'below,' 'upper' and 'lower,' correspond to the orientation that the filter insert 1 later has when it is inserted into a fuel filter that operates in a combustion engine.

Unfiltered fuel flows radially from the outside through the filter medium 2 inwards to the filtered side of the filter insert 1. Water in the fuel is dispersed into fine droplets as it passes through the filter medium 2. A cylindrical coalescer 5 is arranged on the filtered side of the filter medium 2, i.e., in the direction of flow downstream of the filter medium 2, and agglomerates the water droplets into larger drops.

Arranged radially inside the coalescer 5 is a substantially cylindrical support dome 6, which has a plurality of ribs 7 and flow-through passages 8. The fuel with the larger drops of water passes through the flow-through passages 8 into the interior of the support dome 6. A fuel outlet 9 for the filtered fuel is provided in the upper end disc 3. On its way to the fuel outlet 9, the fuel, which still contains the drops of water, passes through a separator 10 which, in this embodiment, is a hydro-phobic screen. This separator 10 is sleeve- or tube-like construction, closed at the bottom, and is affixed at its upper end to a carrier 11 made of plastic. The drops of water are separated out from the fuel at the separator 10 and, because of their greater density, flow downwards through the fuel and pass out of the filter insert 1 through a water drain 12 that is provided in the lower end disc 4. A water collection chamber (not shown) is provided beneath the filter insert 1 in the fuel filter system and is regularly emptied.

In the embodiment illustrated in FIG. 1, the support dome 6 has a shoulder 14 at its upper end on which the carrier 11 is radially supported. A seal lip 15 is provided at the outer circumference of the carrier 11, which forms a seal against the support dome 6. The upper end disc 3 has a downwardly projecting clamping ring 16, which likewise extends within the area created by the shoulder 14 on the inside of the support dome 6. This construction allows the support dome 6 and the carrier 11 together with the separator 10 to be held together while the filter insert 1 is being assembled, before the filter medium 2 is affixed to the two end discs 3, 4. Prior to affixing the two end discs 3, 4, the coalescer 5 can either be pushed onto the support dome 6 or placed in the interior of the filter medium 2 and preferably held in place by clamping forces and thus temporarily held in the desired position during assembly. In addition to its holding function, the clamping ring 16 may also function as a seal in this and in other embodiments.

Figure 2:
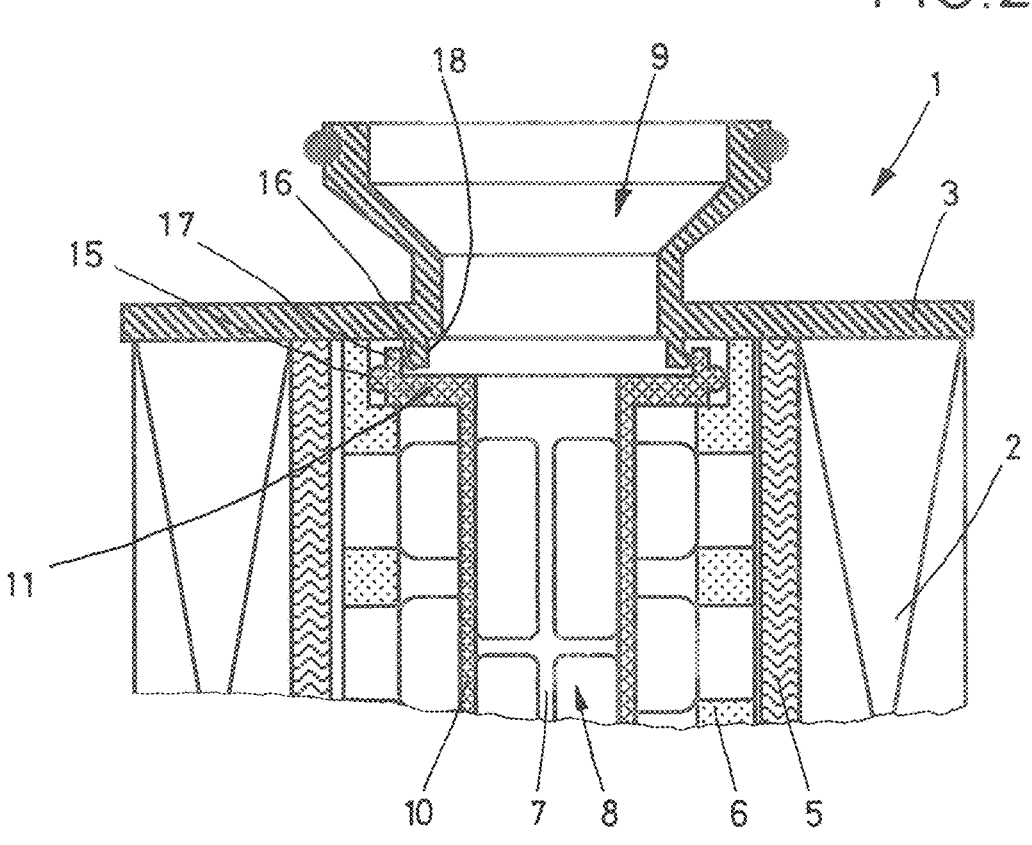
FIG. 2 is a partial cross-sectional view through the filter insert, illustrating a second embodiment of the the carrier supported on the support dome and two radial seals.

FIG. 2 illustrates a second embodiment of the filter insert 1 according to the invention in which the carrier 11 has a carrier collar 17 that extends upward beyond the carrier seal lip 15 and the clamping ring 16 of the upper end disc 3 has a smaller diameter than that of the carrier seal lip 15. In this embodiment, the clamping ring 16 is part of an inner collar 18 that is integrally formed on the upper end disc 3 and that extends downward into the interior of the filter insert 1. The clamping ring 16 serves to hold the carrier 11 and, because the carrier 11 presses firmly against the support dome 6, the clamping ring 16 is also holding the support dome 6 up against the upper end disc 3 during the process of assembling the filter insert 1. The inner collar 18 then, as a support section, also serves to support of the carrier collar 17 with its seal lip 15, thereby ensuring a tight seal between the seal lip 15 and the support dome 6. In this embodiment, the clamping ring 16 is located on approximately the same plane as the seal lip 15 or makes contact against the carrier collar 17 at approximately the same height as the seal lip 15 makes contact against the support dome 6.

Figure 3:
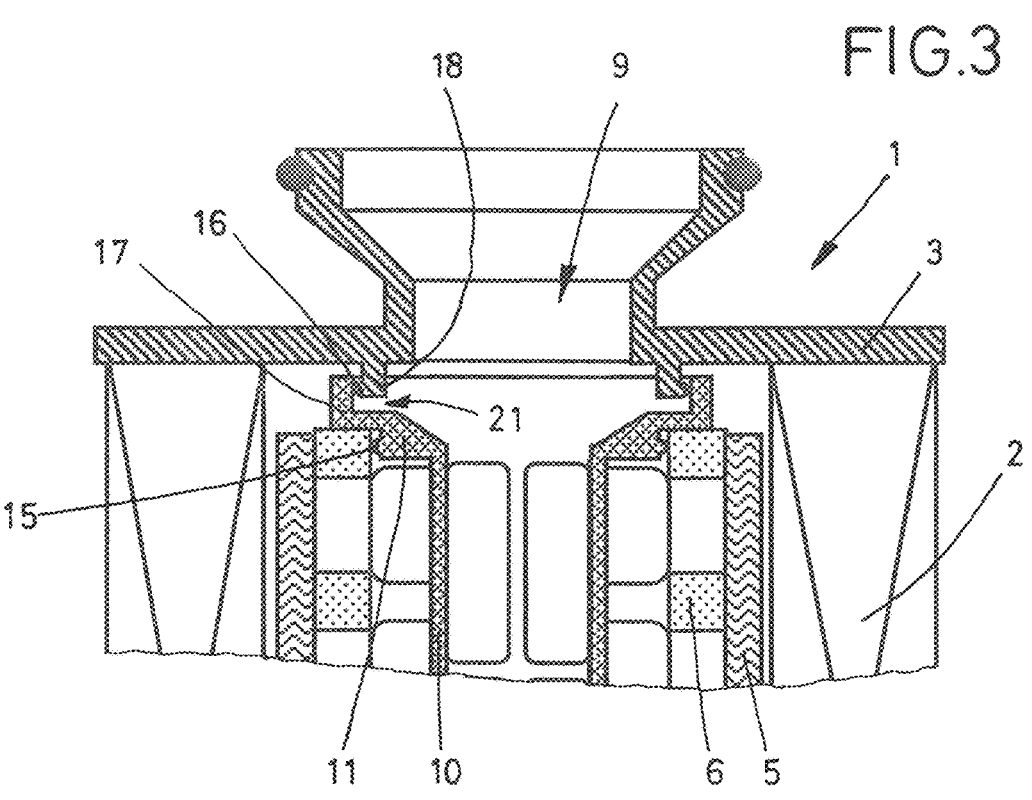
FIG. 3 is a partial cross-sectional view through the filter insert, illustrating a third embodiment of the carrier supported on the support dome and two radial seals.

FIG. 3 illustrates an embodiment in which the upper end disc 3 is essentially the same as that of FIG. 2. In this embodiment, however, the carrier collar 17 is higher than in the embodiment shown in FIG. 2 and extends upward beyond the upper end of the support dome 6. The clamping ring 16 of the inner collar 18 of the upper end disc 3 is offset upwards with respect to the seal lip 15 of the carrier 11 and exerts a clamping force against the upward extension of the carrier collar 17. In this embodiment, too, the inner collar 18 has a support function, in that it supports the seal lip 15 against inwardly acting forces.

The contact between the clamping ring 16 and the carrier collar 17 may also serve to seal the unfiltered side of the fuel filter against the fuel outlet 9. Fuel which has passed through the filter medium 2 but has not yet passed through the coalescer 5 or the separator 10 should not be able to flow under the upper end disc 3 into the interior of the carrier 11, from where it could continue on to the outlet opening 9. Therefore, in the embodiment illustrated in FIG. 3, the inner collar 18 also serves a dual function as a seal ring 21 which, together with the clamping ring 16, provides a secure seal against the carrier collar 17 for fuel and water.

Figure 4:
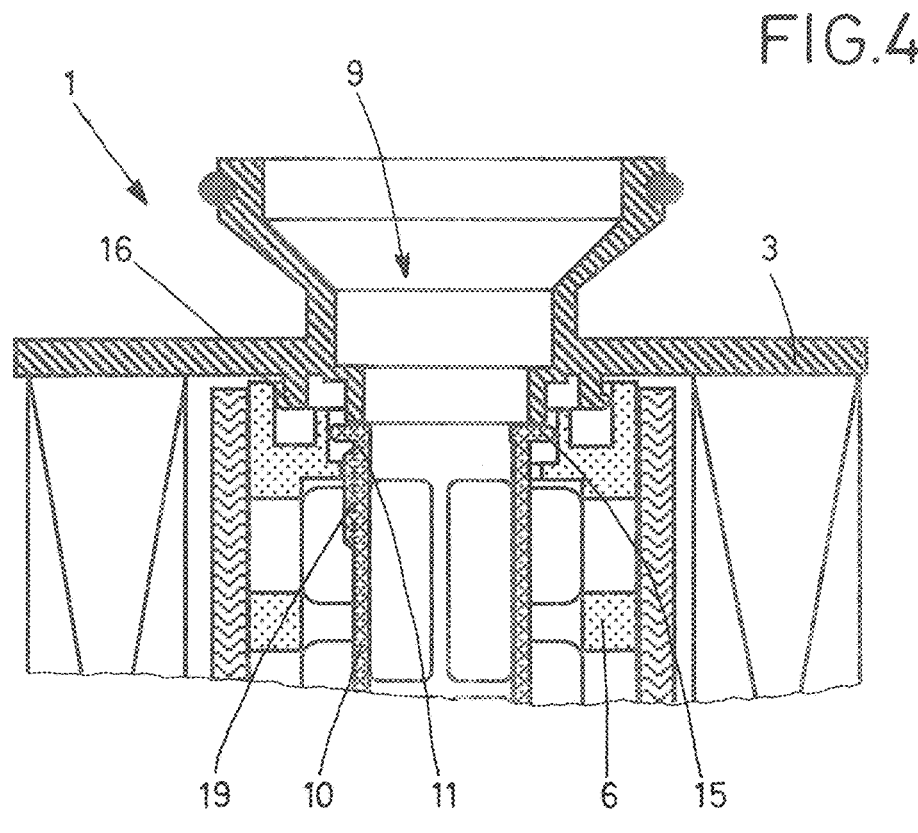
FIG. 4 is a partial cross-sectional view through the filter insert, illustrating a fourth embodiment of the carrier supported against the support dome and two radial seals, as well as a protrusion to prevent a tilting of the carrier.

FIG. 4 illustrates a carrier 11 which has projections or ribs 19 which extend in the axial direction and are distributed around the circumference of the carrier 11. These ribs 19 secure the carrier 11 against axial tilting and, thus, prevent the carrier 11 together with the separator 10 from tilting motions within the support dome 6. In this embodiment, purely by way of example, three ribs 19 are evenly distributed around the circumference of the carrier 11, and thus only one of the three projections 19 is visible in the drawing. In this embodiment as well, the seal lip 15 of the carrier 11 provides a seal against the inside of the support dome 6.

Figure 5:
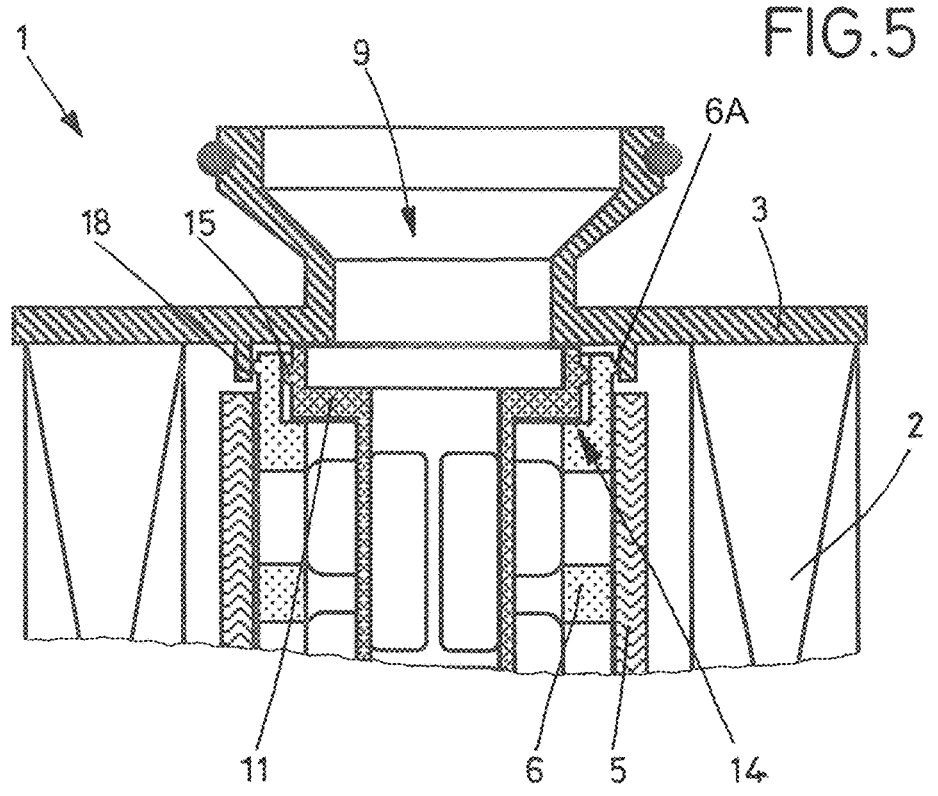
FIG. 5 is a partial cross-sectional view through the filter insert, illustrating a fifth embodiment of the carrier supported on the support dome and two radial seal.

FIG. 5 illustrates an embodiment of the filter insert 1 according to the invention in which two seals are arranged in series at approximately the same height. The seal lip 15 of the carrier 11 is within the area created by the shoulder 14 and presses against the inside of the support dome 6. A circumferential seal lip 6A is provided on the outer circumference of the support dome 6 presses against inner collar 16 of the upper end disc 3. As can be seen, this seal lip 6A is placed at about the same height as the seal lip 15. In this case, too, the inner collar 16 also serves as a support means, because it supports the inner dome 6 against outwardly acting forces and ensures that the seal lip 15 makes a seal against the inner dome 6, even under unfavorable operating conditions of the fuel filter.

Figure 6:
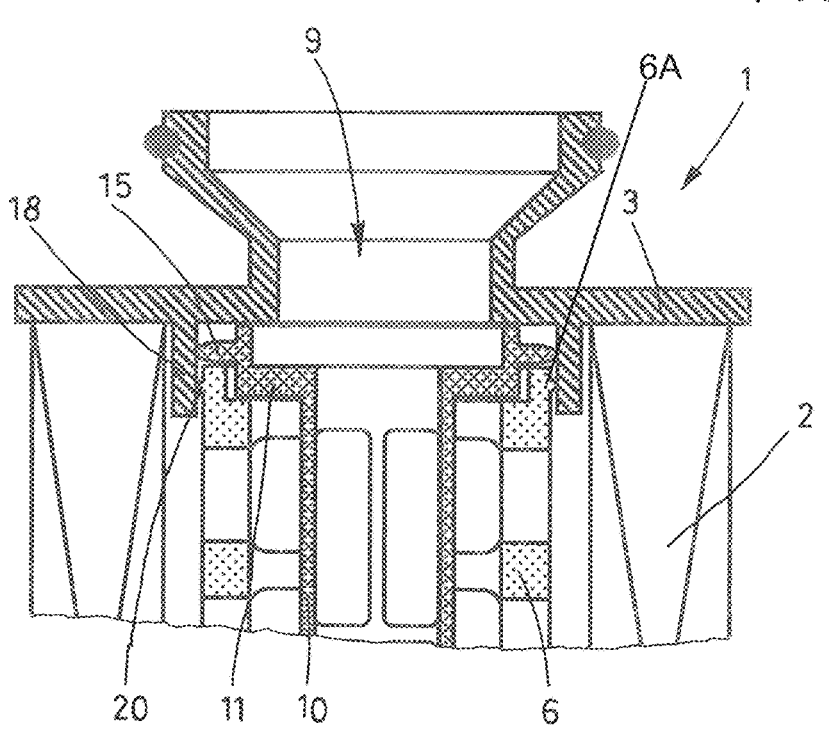
FIG. 6 is a partial cross-sectional view through the filter insert, illustrating a sixth embodiment of the carrier supported on the support dome and two radial seals.

FIG. 6, in comparison to FIG. 5, illustrates an inner collar 18 that extends farther into the interior of the filter insert 1, between the filter medium 2 and the support dome 6. Both the carrier 11 with its seal lip 15 and the inner dome 6 with its own seal lip 6A provide a seal against the inside surface of this inner collar 18.

Figure 7:
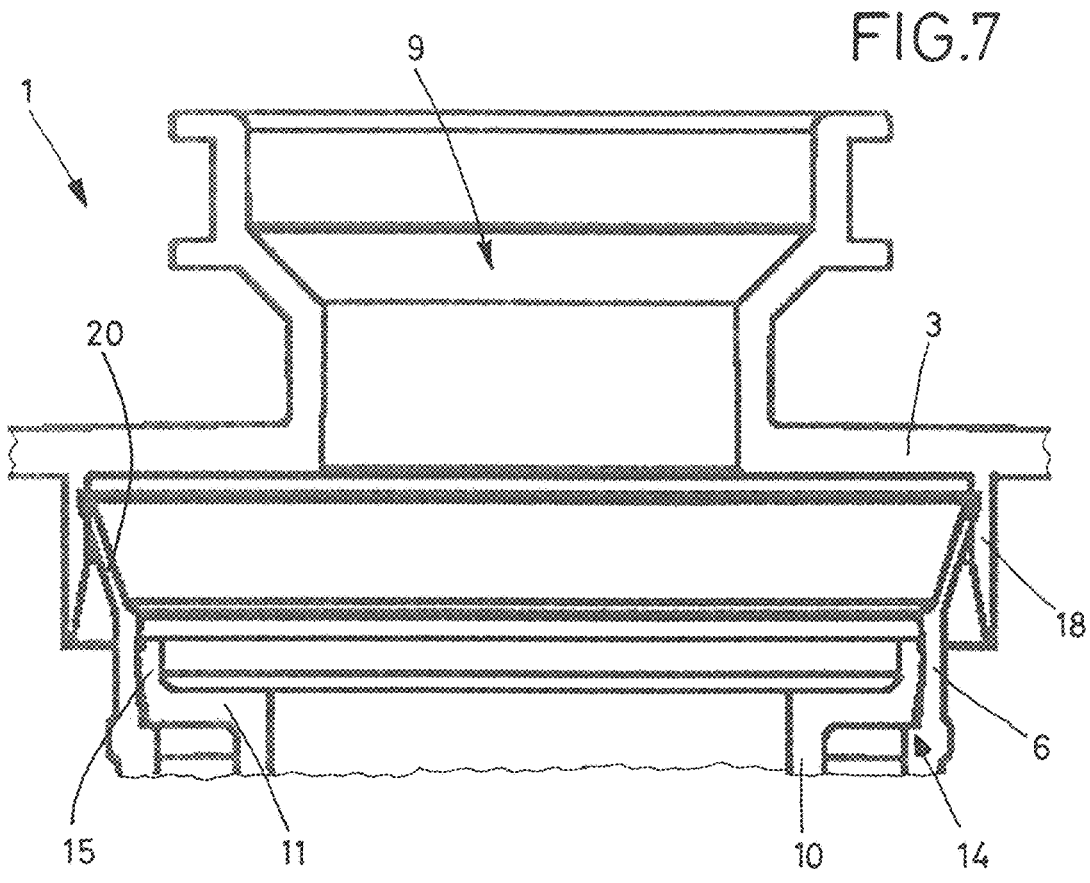
FIG. 7 is a plane view of the upper portion of the filter insert, illustrating an insertion bevel on an inner collar of the upper end disc.

FIG. 7 illustrates a filter insert 1 according to the invention in which the inner collar 18 of the upper end disc 3 forms an insertion bevel on its inner side. A circumferential, upwardly widening dome lip 20 is formed at the upper end of the support dome 6. The carrier 11 of the separator 10 is arranged within the support dome 6. It is desirable during assembly of the filter insert 1 that the carrier 11 be held in the support dome 6 and that it not fall out. To this end, as mentioned previously, the support dome 6 has a shoulder 14 on which the carrier 11 rests. Within the area created by the shoulder 14, the seal lip 15 of the carrier 11 creates a seal against the support dome 6. As can be seen in FIG. 7, the maximum diameter of the conically extending dome lip 20 is greater than the inner diameter of the inner collar 18. As a result, pressing the support dome 6 with its dome lip 20 into the inner collar 18 when assembling the filter insert 1 forces the dome lip 20 to be deformed radially inwards, thereby pressing the outer wall of the shoulder 14 against the seal lip 15 to form a seal.

Thus, the carrier 11 is held in place in the filter element 1 only by the interaction of the upper end disc 3, in particular its inner collar 18, with the support dome 6. Although the seal lip 15 is arranged lower than the inner collar 18, the inner collar 18 acts on the support dome 6 via the dome lip 20 in such a way that the inner collar 18 holds the carrier 11 in place within the support dome 6.

Figure 8:
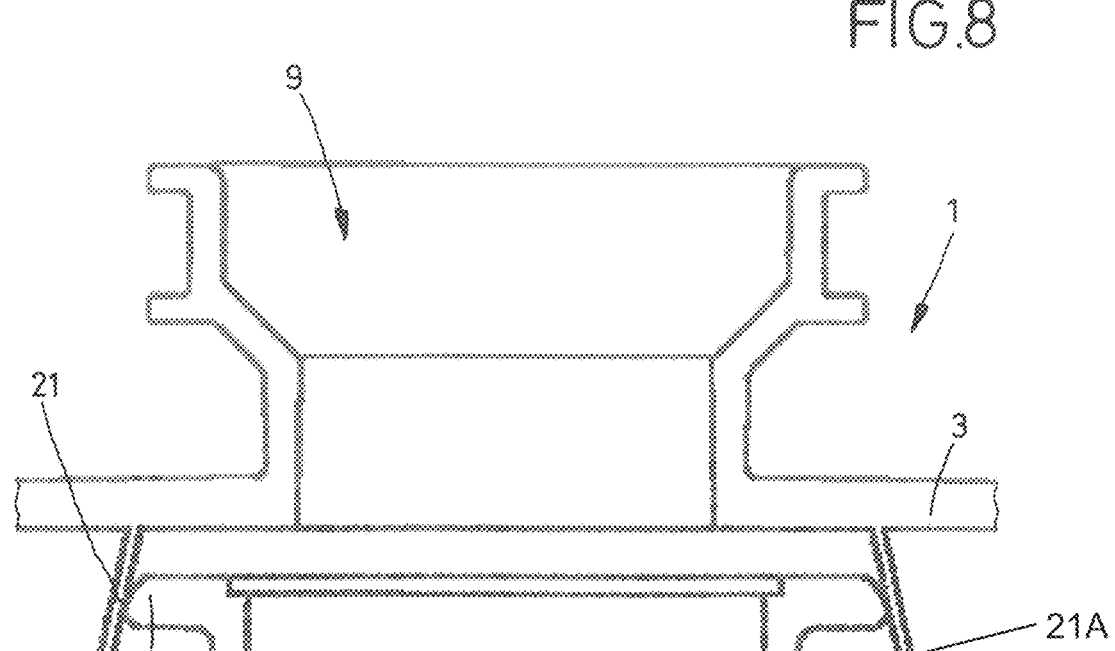
FIG. 8 is a plane view of the upper portion of the filter insert, illustrating an step in assembling the filter insert.

FIG. 8 shows an upper end disc 3 that does not have a stable inner collar 18, but has instead a seal ring 21 that has a thin wall thickness and is intentionally elastically deformable. Starting from the upper end disc 3, the diameter of the seal ring 21 initially widens with increasing distance from the end disc 3. The carrier 11 with its seal lip 15 is arranged inside this seal ring 21, and the support dome 6 is placed against the seal ring 21 from below. This arrangement represents an assembly step in assembling the filter insert 1.

Figure 9:
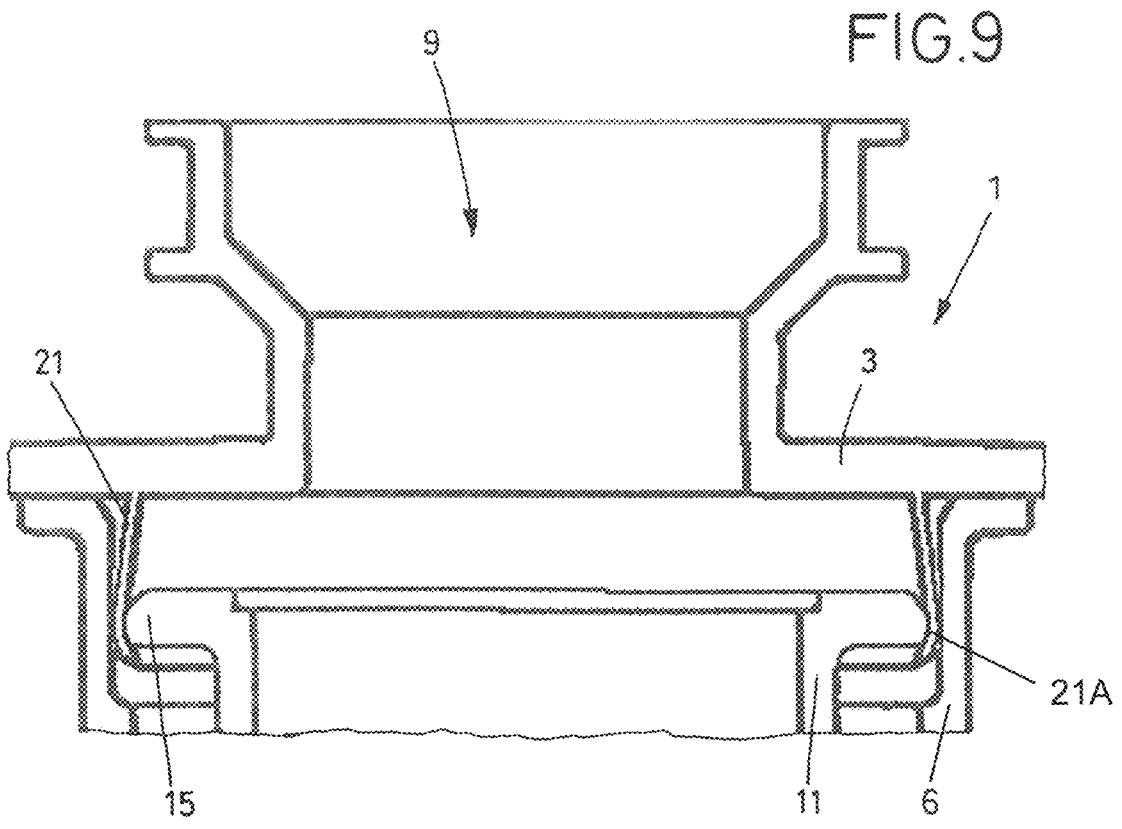
FIG. 9 is a plane view of the upper portion of the filter insert, showing a further step in assembling the filter insert.

FIG. 9 shows a subsequent assembly step, in which, namely, the support dome 6 is pushed up against the upper end disc 3, thereby compressing the initially uncompressed widest diameter of the seal ring 21 to a smaller diameter. The seal ring has a curved cross-section with a curve 21A located in the vicinity of the free end of the seal ring 21 that is farthest from the upper end disc 3. Due to the compression by the support dome 6, the seal lip 15 of the carrier 11 migrates into this curved area, because the seal ring 21 has its largest diameter there, so that subsequently the carrier 11 assumes a stable seat that is sealed against the seal ring 21.

The curve 21A defines the maximum diameter of the seal ring 21. On the side of the curve remote from the end disc 3, the seal ring 21 forms an insertion bevel, in which its diameter decreases progressively from the curve down to the free end of the seal ring 21. This insertion bevel makes it easier for the support dome 6 to be pushed onto the seal ring 21 or to insert the seal ring 21 into the support dome 6 and to hold the carrier 11 in place with a clamping force.

It is understood that the embodiments described herein are merely illustrative of the present invention. Variations in the construction of the filter insert for three-stage filtration may be contemplated by one skilled in the art without limiting the intended scope of the invention herein disclosed and as defined by the following claims.

What is claimed is:

1. A filter insert for use in a fuel filter comprising:
a filter medium that is permeable to a fuel-water mixture, the filter medium being a cylindrical, hollow construction and having a longitudinal axis;
an end disc that has a fuel outlet for filtered fuel to flow out of the fuel filter;
a support dome provided inside the filter medium, the support dome constructed such, that the fuel-mixture flows through it;
a coalescer for coalescing water droplets, the coalescer provided downstream of the filter medium;
a separator provided within the filter medium as a separate component, the separator serving to separate water out of the fuel-water mixture; and
a carrier to which the separator is affixed and that is provided within the support dome;
wherein the carrier is held in place along the longitudinal axis of the filter medium by the support dome and the end disc and forms a radial seal with an adjacent component;
wherein the filter medium is cohesively bonded to the end disc and the support dome is not affixed to the end disc.

2. The filter insert of claim 1,
wherein the coalescer is supported on the support dome, and
wherein the support dome forms a seal against an adjacent component.

3. The filter insert of claim 1, wherein the carrier has a seal lip that extends around an outer circumference of the carrier and forms a seal against the support dome.

4. The filter insert of claim 3, wherein the end disc has an inner collar that extends down inside the carrier and serves to support the carrier against radially inwardly acting forces on the seal lip.

5. The filter insert of claim 4, wherein the seal lip of the carrier and the inner collar of the end disc are offset with respect to one another in the axial direction.

6. The filter insert of claim 3, wherein the seal lip on the carrier exerts a radial outward force on the support dome; and wherein the end disc has an inner collar that functions as a support section and which presses against the outside of the support dome, thereby supporting an area of the support dome against the radial outward force from the seal lip.

7. The filter insert of claim 6, wherein the support dome has a dome lip that is elastically deformable and which has an outer diameter that is greater than an inner diameter of the inner collar, such, that the inner collar of the end disc exerts a deforming pressure on the dome lip.

8. The filter insert of claim 1, wherein the end disc has a seal ring that extends into the filter medium, and wherein a seal lip is provided on the seal ring or on the carrier so as to form form a seal between the seal ring and the carrier.

9. The filter insert of claim 1, further comprising:

a projection on an outside surface of the carrier and/or on the inside of the support dome that limits an ability of the carrier to tilt in the support dome.

10. The filter insert of claim 9, wherein the projection is constructed as a rib that extends in the axial direction.

11. The filter insert of claim 9, wherein the projection includes a plurality of projections around the circumference of the carrier.

12. The filter insert of claim 1, wherein the carrier is mounted so as to allow for some displacement in the direction of the longitudinal axis of the filter medium.

13. The filter insert of claim 1, wherein the end disc has a seal ring that is elastically deformable and has a diameter that increases in a direction that extends away from the end disc;

wherein the carrier has an outer circumferential seal lip; and and wherein the carrier with the seal lip extends into the seal ring and the support dome presses against the seal ring in such a way that compresses the seal ring, thereby holding the carrier in place.

14. The filter insert of claim 13, wherein the diameter of the seal ring initially increases from the end disc in the direction of a free end, and then, after reaching a maximum dimension, decreases toward the free end.

* * * * *